(12) United States Patent  (10) Patent No.: US 8,242,951 B2
Brandao et al.  (45) Date of Patent: Aug. 14, 2012

(54) SYSTEM AND METHOD FOR GENERATING A REFERENCE SIGNAL FOR PHASE CALIBRATION OF A SYSTEM

(75) Inventors: Ruy Lopes Brandao, Ft. Lauderdale, FL (US); Pal Meiyappan, Bellevue, WA (US); Ruy C. Brandao, Redmond, WA (US); James Burton Jones, Carnation, WA (US); Mark Virtue, Kirkland, WA (US); Paul Ferguson, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 314 days.

(21) Appl. No.: 12/756,311

(22) Filed: Apr. 8, 2010

(65) Prior Publication Data

US 2010/0259439 A1 Oct. 14, 2010

Related U.S. Application Data

(60) Provisional application No. 61/168,500, filed on Apr. 10, 2009.

(51) Int. Cl.
G01S 13/93 (2006.01)
G01S 7/40 (2006.01)

(52) U.S. Cl. .......................................... 342/30; 342/174

(58) Field of Classification Search .............. 342/30–32, 342/37, 174
See application file for complete search history.

(56) References Cited

U.S. PATENT DOCUMENTS

| | | | |
|---|---|---|---|
| 3,091,765 A | 5/1963 | Tatel | |
| 4,673,944 A | 6/1987 | Graves | |
| 4,855,748 A | 8/1989 | Brandao et al. | |
| 4,855,749 A | 8/1989 | DeFonzo | |
| 5,008,844 A | 4/1991 | Kyriakos et al. | |
| 5,469,172 A * | 11/1995 | Schleder et al. | 342/174 |
| 5,493,710 A * | 2/1996 | Takahara et al. | 455/192.2 |
| 5,572,219 A * | 11/1996 | Silverstein et al. | 342/375 |
| 6,278,396 B1 * | 8/2001 | Tran | 342/29 |
| 6,285,313 B1 | 9/2001 | Wahab et al. | |
| 6,392,598 B1 | 5/2002 | Jones et al. | |
| 7,482,976 B2 * | 1/2009 | Plesinger | 342/372 |
| 7,583,223 B2 | 9/2009 | Brandao et al. | |
| 2003/0030582 A1 * | 2/2003 | Vickers | 342/54 |
| 2008/0068250 A1 | 3/2008 | Brandao et al. | |
| 2009/0027258 A1 | 1/2009 | Stayton | |
| 2009/0109085 A1 * | 4/2009 | Needham et al. | 342/174 |
| 2010/0259439 A1 * | 10/2010 | Brandao et al. | 342/30 |
| 2012/0028587 A1 * | 2/2012 | Ferguson et al. | 455/67.14 |

FOREIGN PATENT DOCUMENTS

EP 2239596 A2 * 10/2010

* cited by examiner

*Primary Examiner* — John B Sotomayor
(74) *Attorney, Agent, or Firm* — Lowe Graham Jones PLLC

(57) ABSTRACT

A two-element array antenna system includes a first antenna element and a second antenna element. The first and second antenna elements respectively include first and second frequency multipliers. A transmitting, receiving, and processing (TRP) system is coupled to the first and second antenna elements via, respectively, a single first transmission element and a single second transmission element. The TRP system is configured to transmit to the first antenna element a first input signal at a sub-multiple of a first frequency, receive from the first frequency multiplier a first calibration signal based on the first input signal, transmit to the second antenna element a second input signal at a sub-multiple of the first frequency, receive from the second frequency multiplier a second calibration signal based on the second input signal, and determine, based on the calibration signals, a relative phase difference between the first and second transmission elements.

19 Claims, 4 Drawing Sheets

SYSTEM AND METHOD FOR GENERATING A REFERENCE SIGNAL FOR PHASE CALIBRATION OF A SYSTEM

PRIORITY CLAIM

This application claims priority from U.S. Provisional Application No. 61/168,500, entitled "METHOD FOR GENERATING A REFERENCE SIGNAL FOR PHASE CALIBRATION OF A SYSTEM," filed Apr. 10, 2009, which is hereby incorporated by reference as if fully set forth herein.

BACKGROUND OF THE INVENTION

Current Traffic Collision Avoidance System (TCAS) installations are expensive. Dual TCAS installations are even more so because they require an extensive amount of cable and/or coaxial cable switches. U.S. Pat. No. 4,855,748 describes a system and method for determining TCAS bearing estimation using a four-element planar array antenna. TCAS installations typically use two such four-element antennas, one on the top surface of an aircraft, and the other on the bottom surface of the aircraft. This typically requires a coaxial cable connection for each antenna element, resulting in at least eight total cables. This results in considerable weight and expense.

Commonly owned U.S. Pat. No. 7,583,223, which is hereby incorporated by reference as if fully set forth herein, discloses a system that includes a first antenna and a second antenna located on a top surface of an aircraft, spaced apart along a first axis, as well as a third antenna and a fourth antenna located on a bottom surface of the aircraft, spaced apart along a second axis orthogonal to the first axis. The system also includes a transmitting, receiving, and processing system coupled to the first, second, third, and fourth antennas, wherein the transmitting, receiving, and processing system is configured to transmit TCAS interrogations, receive TCAS replies, and process the TCAS replies to determine the relative bearing of a second aircraft from the first aircraft. Such a system provides a TCAS antenna system, employing two pairs of two-element arrays, that uses less cabling than previous attempts, specifically, four cables (two to top and two to bottom) instead of eight cables (four to top and four to bottom).

Commonly owned U.S. Pat. No. 4,855,748 discloses an approach by which cables associated with four-element antenna arrays may be phase calibrated. However, such approach cannot be employed for phase calibration of the above-described two-element arrays.

SUMMARY OF THE INVENTION

In an embodiment, a two-element array antenna system includes a first antenna element and a second antenna element. The first and second antenna elements respectively include first and second frequency multipliers. A transmitting, receiving, and processing (TRP) system is coupled to the first and second antenna elements via, respectively, a single first transmission element and a single second transmission element. The TRP system is configured to transmit to the first antenna element a first input signal at a sub-multiple of a first frequency, receive from the first frequency multiplier a first calibration signal based on the first input signal, transmit to the second antenna element a second input signal at a sub-multiple of the first frequency, receive from the second frequency multiplier a second calibration signal based on the second input signal, and determine, based on the calibration signals, a relative phase difference between the first and second transmission elements.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment of the invention provides an approach that keeps the antenna components simple while nonetheless generating a reference source at the antenna for phase calibrating the cables. The antenna includes, for example, a frequency multiplier or mixer. The TCAS or system that requires phase calibration of the cables transmits a signal at a sub-multiple of the desired calibration frequency. The frequency multiplier at the antenna then generates the desired frequency. The multiplier is designed so that it would not function for regular operations of the TCAS or system, but would operate when the sub-multiple frequency signal was transmitted by the TCAS. Alternatively, the TCAS or system transmits two signals with frequencies such that the sum or difference of these signals produces the desired calibration frequency.

Figure 1:
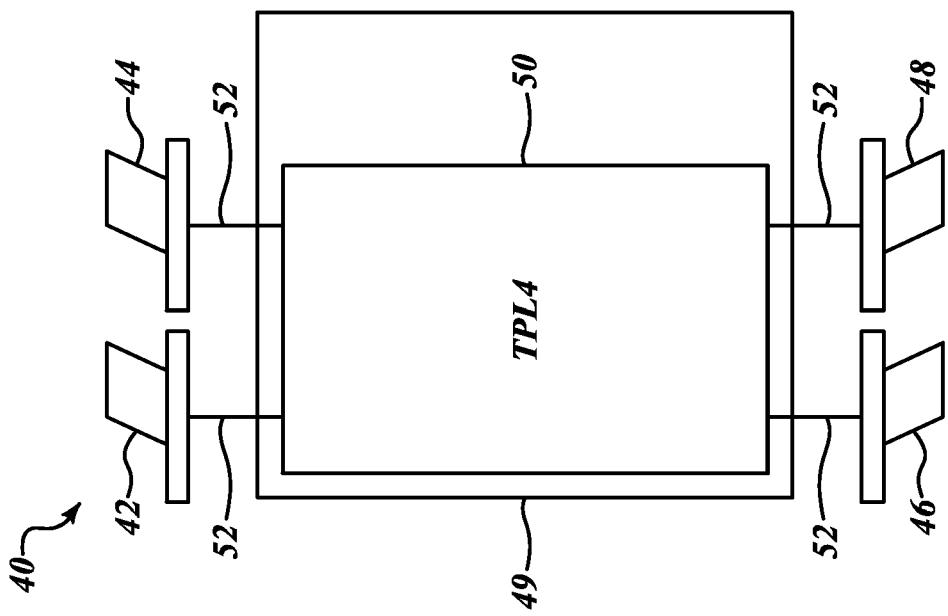
FIG. 1 is a high-level block diagram showing an antenna configuration for a TCAS system in accordance with an embodiment of the invention.

FIG. 1 is a high-level block diagram showing a TCAS system 40 within which an embodiment of the invention may be implemented. The system 40 includes a first top antenna 42, a second top antenna 44, a first bottom antenna 46, and a second bottom antenna 48. Each of the antennas 42, 44, 46, and 48 are connected to a transmitting, receiving, and processing (TRP) system 49 by a transmission element, such as a cable 52, resulting in four total cables 52 for the system 40. The system 49 includes a Line Replaceable Unit (LRU) 50, designated as TPL4 that includes transmitting, receiving, and processing components.

When installed on an aircraft, the first top antenna 42 and the second top antenna 44 are positioned on a top surface of the aircraft, spaced apart along a first axis while the first bottom antenna 46 and the second bottom antenna 48 are positioned on a bottom surface of the aircraft, spaced apart along a second axis orthogonal to the first axis. In an example embodiment, the antennas 42, 44, 46, 48 are L-band blade antennas. In one example, an L-band blade antenna is any single element L-band antenna suitable for transponder or DME applications, and may be a simple, standard matched-quarter-wave stub antenna.

Figure 2:
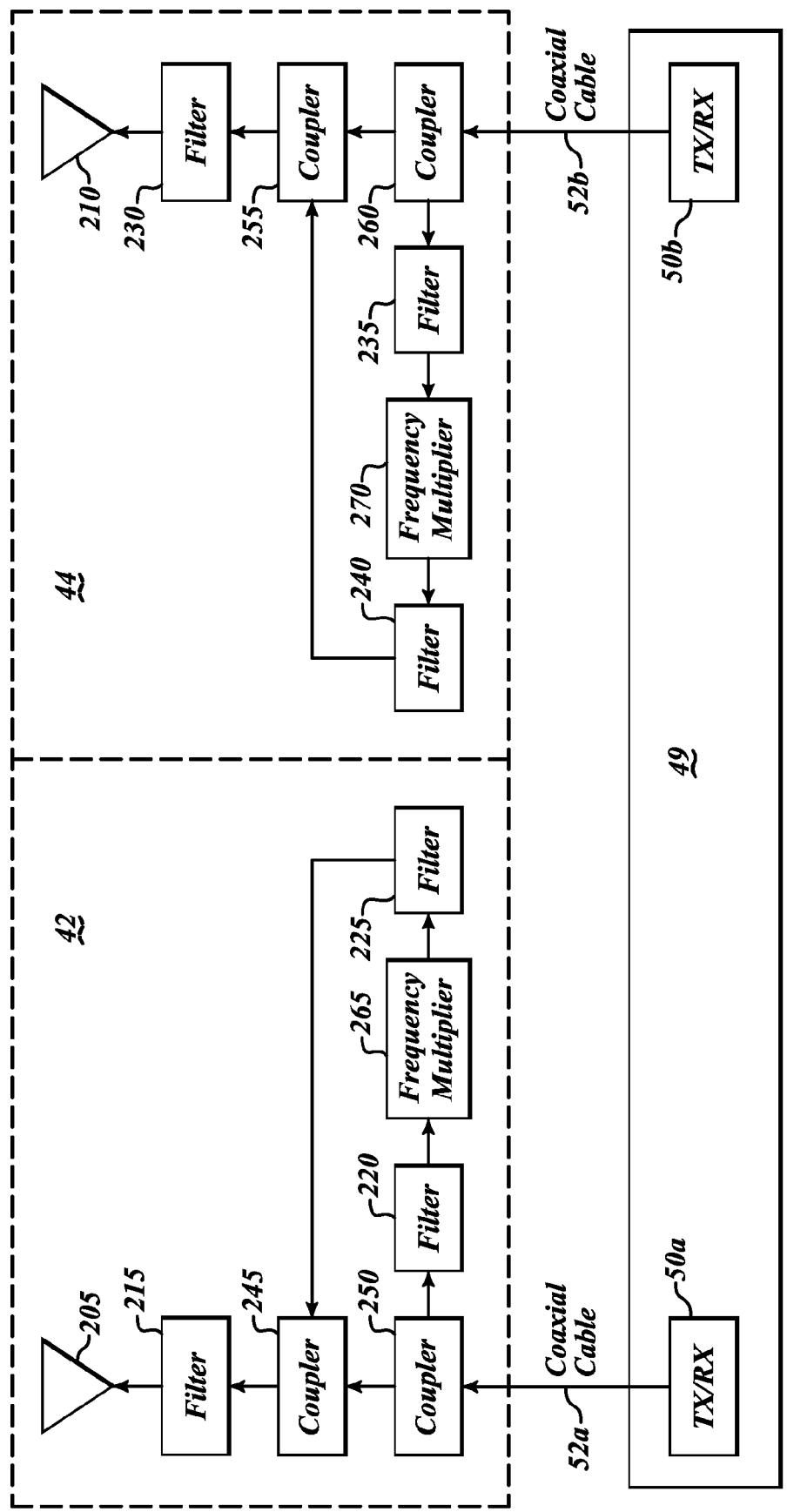
FIG. 2 is a high-level block diagram showing a two-element array antenna configuration in accordance with an embodiment of the invention.

Referring now to FIG. 2, illustrated is a phase calibration approach for a two-element array according to an embodiment of the invention. It should be understood that the following discussion of phase-calibration techniques employed by varying embodiments of the invention applies to antenna arrays including no more or fewer than two antenna elements.

In the illustrated embodiment, antenna elements 42, 44 are respectively coupled to the TRP system 49 by single coaxial cables 52a, 52b. As illustrated, the TRP system 49 may include one or more LRUs 50a, 50b coupled to cables 52a, 52b. The antenna elements 42, 44 respectively include radiating structures 205, 210, attenuation elements, such as filters 215, 220, 225, 230, 235, 240, signal-coupling elements 245, 250, 255, 260, and frequency multipliers 265, 270.

In operation, when phase calibration of cables 52a, 52b is desired, the TRP system 49 is configured to transmit to antenna element 42 a first input signal, and to element 44 a second input signal, each at a sub-multiple of a desired first calibration frequency (e.g., 1030 MHz). These input signals may be respectively generated by LRUs 50a, 50b or by a single one of LRUs 50a, 50b.

Input-side filters 220, 235, which may include low-pass filters, are configured to pass to the frequency multipliers 265, 270, respectively, only signals at frequencies in a finite range including the frequencies (e.g., 515 MHz) of the first and second input signals. In this manner, the illustrated embodiment ensures that the multipliers 265, 270 are idle or otherwise non-functional for regular operations of the antenna system, and will be operational only during calibration processes.

The frequency multipliers 265, 270 may each include a self-biased non-linear device to generate harmonics of its input signal (e.g., the first and second input signals). The input signal level of the multipliers 265, 270 is chosen in such a way that the desired sub-harmonic input signal drives such non-linear device strong enough to generate a desired calibration signal, whereas other signals arriving at the multipliers 265, 270 are attenuated by the filters 220, 235, sufficiently such that they do not generate strong harmonics or strong sub harmonics.

Output-side filters 225, 240, which may include band-pass filters, are configured to pass to the TRP system 49 only signals at frequencies in a finite range including the frequency of the desired calibration signal (e.g., 1030 MHz).

The desired calibration signals output by the filters 225, 240 are coupled back to the antenna cables 52a, 52b by coupling devices 245, 255. These coupled signals travel by the antenna cables 52a, 52b to the TRP system 49. The TRP system 49 measures the phase information associated with these signals.

The above-described measurement process may be repeated using sub-multiples of a second frequency (e.g., 1090 MHz) of a different desired calibration signal that is not harmonically related to the first frequency (e.g., 1030 MHz). The TRP system 49 may use the phase information associated with the received calibration signals (e.g., at 1030 MHz and 1090 MHz) to calculate the relative phase difference between antenna cables 52a, 52b.

Figure 3:
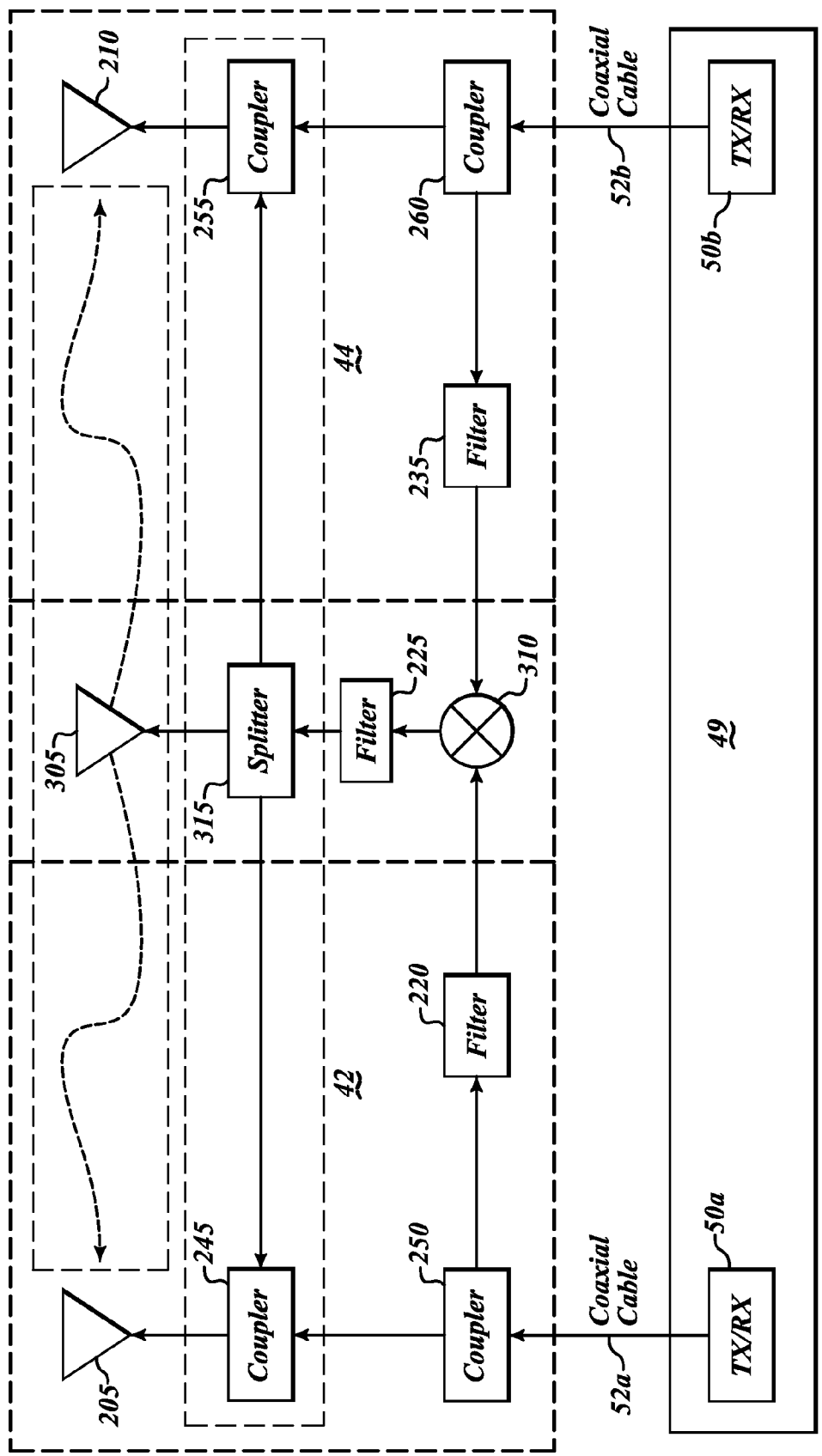
FIG. 3 is a high-level block diagram showing a two-element array antenna configuration in accordance with an alternate embodiment of the invention.

Referring now to FIG. 3, illustrated is a phase calibration approach for a two-element array according to an alternative embodiment of the invention. In the illustrated embodiment, antenna elements 42, 44 are respectively coupled to the TRP system 49 by single coaxial cables 52a, 52b. As illustrated, the TRP system 49 may include one or more LRUs 50a, 50b coupled to cables 52a, 52b. The antenna elements 42, 44 respectively include radiating structures 205, 210, attenuation elements, such as filters 220, 235, and signal-coupling elements 245, 250, 255, 260. One of the elements 42, 44 may further include a mixer element 310, an attenuation element, such as filter 225, and either a splitter element 315 or a probe 305. Alternatively, the mixer element 310, filter 225, splitter element 315 and/or probe 305 may be external, but coupled, to elements 42, 44.

The mixer element 310 may be passive or active in operation. The mixer may be constructed from 1, 2, or 4 diodes or transistors which are interconnected with printed copper structures and/or wire wound balun transformers. The diodes/transistors may not require any type of DC bias voltage or current in order to operate. Rather, one of the two RF signals applied to the mixer is at a level sufficient to "drive" the diodes/transistors into conduction on at least one half cycle of the signal's sinewave. This provides the switching function that results in frequency mixing (addition and substraction). Since the mixer does not require any DC power, it is typically considered a passive circuit even though it contains semiconductor devices.

In operation, when phase calibration of cables 52a, 52b is desired, the TRP system 49 is configured to transmit to antenna element 42 a first input signal at a first frequency, and to element 44 a second input signal at a second frequency, which may or may not be different from the first frequency. These input signals may be respectively generated by LRUs 50a, 50b or by a single one of LRUs 50a, 50b.

Input-side filters 220, 235, which may include low-pass filters, are configured to pass to the mixer element 310 only signals at frequencies in a finite range including the first and second frequencies of the first and second input signals. In this manner, the illustrated embodiment ensures that the mixer element 310 is idle or otherwise non-functional for regular operations of the antenna system, and will be operational only during calibration processes. While the illustrated embodiment employs filtering devices, it should be recognized that selective attenuation may be alternatively accomplished by frequency-selective loading by short or open circuits, or other appropriate techniques.

The frequencies of the first and second input signals generated by the TRP system 49 are such that the sum or difference, as generated by the mixer, of these signals provides a first calibration signal at a desired calibration frequency (e.g., 1030 or 1090 MHz).

Output-side filter 225, which may include one or more band-pass filters, is configured to pass to the TRP system 49 only signals at frequencies in a finite range including the frequency of the desired calibration signal (e.g., 1030 or 1090 MHz).

The desired calibration signal output by the filter 225 may be coupled back to the antenna cables 52a, 52b in one of at least two ways. In an embodiment, splitter element 315 is configured to provide the first calibration signal to the cables 52a, 52b, by way of coupling devices 245, 255, for transmission to the TRP system 49. Alternatively, probe 305 is configured to wirelessly provide the first calibration signal to the cables 52a, 52b. In either case, this coupled first calibration signal travels by the antenna cables 52a, 52b to the TRP system 49. The TRP system 49 may use the phase information associated with the received calibration signal (e.g., at 1030 MHz and 1090 MHz) to calculate the relative phase difference between antenna cables 52a, 52b.

Figure 4:
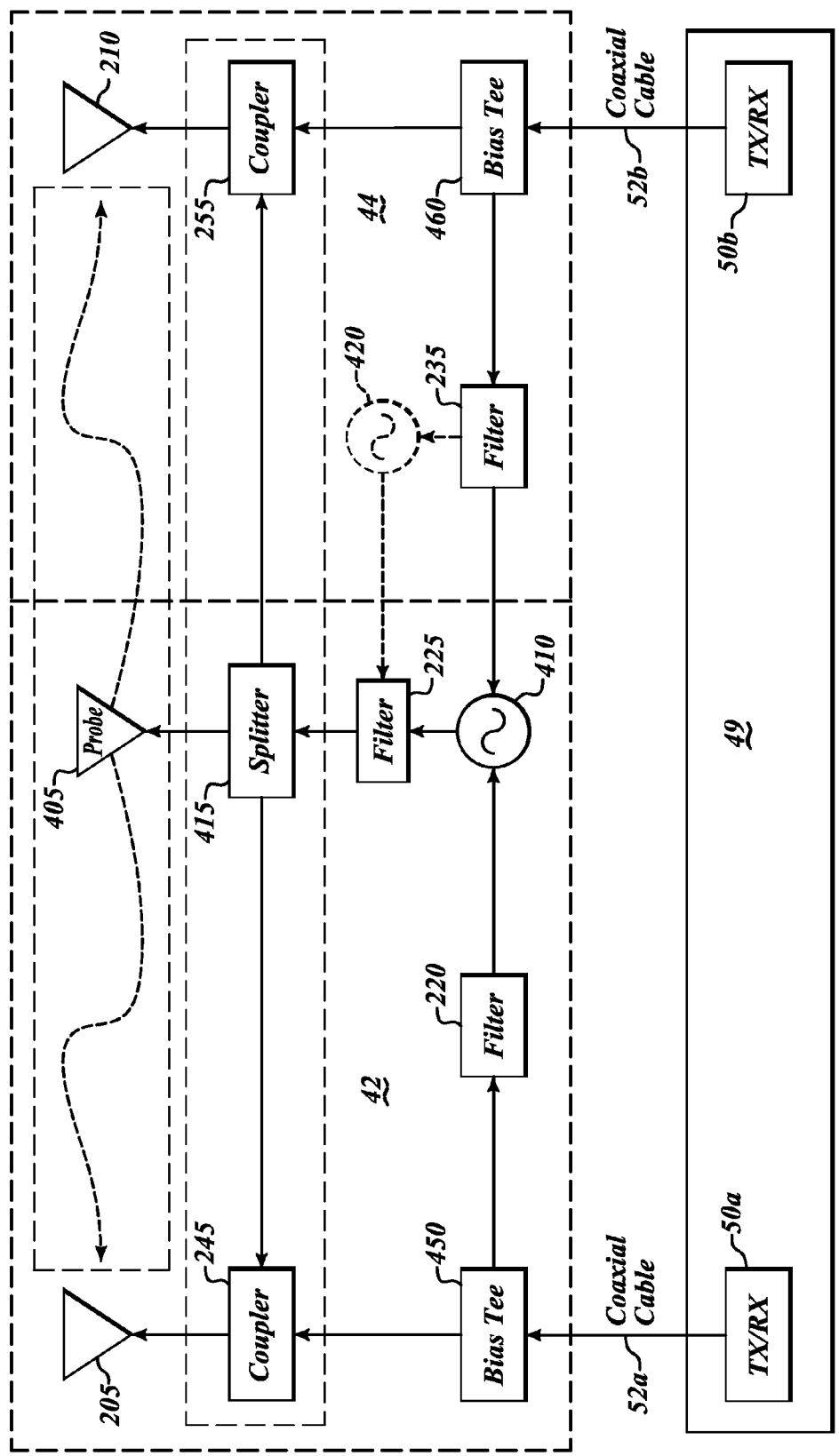
FIG. 4 is a high-level block diagram showing a two-element array antenna configuration in accordance with a second alternate embodiment of the invention.

Referring now to FIG. 4, illustrated is a phase calibration approach for a two-element array according to a second alternative embodiment of the invention. In the illustrated embodiment, antenna elements 42, 44 are respectively coupled to the TRP system 49 by single coaxial cables 52a, 52b. As illustrated, the TRP system 49 may include one or more LRUs 50a, 50b coupled to cables 52a, 52b. The antenna elements 42, 44 may respectively include radiating structures 205, 210, attenuation elements, such as filters 220, 235, bias tees 450, 460 and signal-coupling elements 245, 255. Element 42 may further include an oscillator element 410, an attenuation element, such as filter 225, and either a splitter element 415 or a probe 405.

In operation, when phase calibration of cables 52a, 52b is desired, the TRP system 49 is configured to transmit to antenna element 42, via cable 52a, a first activation signal at a first voltage or current. Transmission of the activation signal may be accomplished via a center conductor (not shown) of cable 52a.

Input-side filter 220, which may include a low-pass filter, may be configured to pass to the oscillator element 410 only signals at low frequencies in a finite range including DC. In this manner, the illustrated embodiment ensures that the oscillator element 410 is idle or otherwise non-functional for regular operations of the antenna system, and will be operational only during calibration processes. While the illustrated embodiment employs filtering devices, it should be recognized that selective attenuation may be alternatively accomplished by frequency-selective loading by short or open circuits, or other appropriate techniques.

In response to the first activation signal, the oscillator element 410 provides a first calibration signal at a desired first calibration frequency (e.g., 1030 MHz).

Output-side filter 225, which may include one or more band-pass filters, is configured to pass to the TRP system 49 only signals at frequencies in a finite range including the frequency of the desired calibration signal (e.g., 1030 MHz).

The first desired calibration signal output by the filter 225 may be coupled back to the antenna cables 52a, 52b in one of at least two ways. In an embodiment, splitter element 415 is configured to provide the first calibration signal to the cables 52a, 52b, by way of coupling devices 245, 255, for transmission to the TRP system 49. Alternatively, probe 405 is configured to wirelessly provide the first calibration signal to the cables 52a, 52b. In either case, this coupled first calibration signal travels by the antenna cables 52a, 52b to the TRP system 49. The TRP system 49 may use the phase information associated with the received first calibration signal (e.g., 1030 MHz) to calculate the relative phase difference between antenna cables 52a, 52b.

Subsequently, and in a fashion similar to that described above, the TRP system 49 may transmit to antenna element 42, via cable 52a, a second activation signal at a second voltage or current.

Input-side filter 220, which may include a low-pass filter, is configured to attenuate to the oscillator element 410 only signals at frequencies in a finite range including the second frequency of the second activation signal. In response to the second activation signal, the oscillator element 410 provides a second calibration signal at a desired calibration frequency (e.g., 1090 MHz).

Output-side filter 225, which may include one or more band-pass filters, is configured to pass to the TRP system 49 only signals at frequencies in a finite range including the frequency of the second desired calibration signal (e.g., 1090 MHz).

The second desired calibration signal output by the filter 225 may be coupled back to the antenna cables 52a, 52b in a manner described above. The TRP system 49 may use the phase information associated with the received first and second calibration signals (e.g., at 1030 MHz and 1090 MHz) to calculate the relative phase difference between antenna cables 52a, 52b.

In an embodiment, and as illustrated by dashed elements in FIG. 4, element 44 may include a second oscillator element 420. In such an embodiment, subsequent to the TRP system 49 transmitting to antenna element 42, via cable 52a, the first activation signal at a first voltage or current, the TRP system 49 may transmit to antenna element 44, via cable 52b, a second activation signal at a second voltage or current. In a manner similar to that described above, the second oscillator element 420, in response to the second activation signal, provides, via filter 225 and one of splitter 415 or probe 405, a second calibration signal at a desired calibration frequency (e.g., 1090 MHz), such that the TRP system 49 may similarly use the phase information associated with the received first and second calibration signals (e.g., at 1030 MHz and 1090 MHz) to calculate the relative phase difference between antenna cables 52a, 52b.

While the preferred embodiment of the invention has been illustrated and described, as noted above, many changes can be made without departing from the spirit and scope of the invention. For example, rather than using L-band blade antennas, L-band antennas integrated into skin surfaces of an aircraft could be used in some embodiments. Additionally, a top two-element antenna and a bottom two-element antenna are used in some embodiments, with the first antenna being replaced by the first element of the top two-element antenna, the second antenna being replaced by the second element of the top two-element antenna, the third antenna being replaced by the first element of the bottom two-element antenna, and the fourth antenna being replaced by the second element of the bottom two-element antenna. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A two-element array antenna system, comprising:
   a first antenna element and a second antenna element, the first antenna element comprising a first frequency multiplier, the second antenna element comprising a second frequency multiplier; and
   a transmitting, receiving, and processing (TRP) system coupled to the first and second antenna elements, the TRP system being coupled to the first antenna element via a single first transmission element, the TRP system being coupled to the second antenna element via a single second transmission element,
   wherein the TRP system is configured to:
      transmit to the first antenna element a first input signal at a sub-multiple of a first frequency,
      receive from the first frequency multiplier a first calibration signal based on the first input signal,
      transmit to the second antenna element a second input signal at a sub-multiple of the first frequency,
      receive from the second frequency multiplier a second calibration signal based on the second input signal, and
      determine, based on the first and second calibration signals, a relative phase difference between the first and second transmission elements.

2. The system of claim 1, wherein the TRP system is further configured to:
   transmit to the first antenna element a third input signal at a sub-multiple of a second frequency different from the first frequency,
   receive from the first frequency multiplier a third calibration signal based on the third input signal,
   transmit to the second antenna element a fourth input signal at a sub-multiple of the second frequency,
   receive from the second frequency multiplier a fourth calibration signal based on the fourth input signal, and determine, based on the first, second, third and fourth calibration signals, a relative phase difference between the first and second transmission elements.

3. The system of claim 2, wherein:
the first antenna element further comprises a first input-side attenuation element; and
the second antenna element further comprises a second input-side attenuation element,
wherein the first and second input-side attenuation elements are configured to attenuate to the first and second frequency multipliers only signals at frequencies in a finite range including the frequencies of the first, second, third and fourth input signals.

4. The system of claim 2, wherein:
the first antenna element further comprises a first output-side attenuation element; and
the second antenna element further comprises a second output-side attenuation element,
wherein the first and second output-side attenuation elements are configured to attenuate to the TRP system only signals at frequencies in a finite range including the first and second frequencies.

5. The system of claim 3, wherein the first and second input-side attenuation elements comprise low-pass filters.

6. The system of claim 1, wherein the TRP system includes a first transmitter coupled to the first transmission element and configured to generate the first input signal, and a second transmitter coupled to the second transmission element and configured to generate the second input signal.

7. A two-element array antenna system, comprising:
a first antenna element and a second antenna element;
a mixer element coupled to the first and second antenna elements; and
a transmitting, receiving, and processing (TRP) system coupled to the first and second antenna elements, the TRP system being coupled to the first antenna element via a single first transmission element, the TRP system being coupled to the second antenna element via a single second transmission element,
wherein the TRP system is configured to:
transmit to the first antenna element a first input signal at a first frequency,
transmit to the second antenna element a second input signal at a second frequency different from the first frequency,
receive from the mixer element, via the first and second transmission elements, a first calibration signal based on the first and second input signals, and
determine, based on the first calibration signal, a relative phase difference between the first and second transmission elements.

8. The system of claim 7, further comprising a splitter element at an output of the mixer element and configured to provide the first calibration signal to the first and second transmission elements for transmission to the TRP system.

9. The system of claim 7, further comprising a probe element at an output of the mixer element and configured to wirelessly provide the first calibration signal to the first and second transmission elements for transmission to the TRP system.

10. The system of claim 7, wherein:
the first antenna element comprises a first input-side attenuation element; and
the second antenna element comprises a second input-side attenuation element,
wherein the first and second input-side attenuation elements are configured to attenuate to the mixer element only signals at frequencies in a finite range including the first and second frequencies.

11. The system of claim 7, wherein:
the first calibration signal is at a third frequency, the third frequency being one of a sum of and a difference between the first and second frequencies;
the system further comprising an output-side attenuation element, wherein the output-side attenuation element is configured to attenuate to the TRP system only signals at frequencies in a finite range including the third frequency.

12. The system of claim 10, wherein the first and second input-side attenuation elements comprise low-pass filters.

13. The system of claim 7, wherein the TRP system includes a first transmitter coupled to the first transmission element and configured to generate the first input signal, and a second transmitter coupled to the second transmission element and configured to generate the second input signal.

14. A two-element array antenna system, comprising:
a first antenna element and a second antenna element;
a first oscillator element coupled to the first antenna element; and
a transmitting, receiving, and processing (TRP) system coupled to the first and second antenna elements, the TRP system being coupled to the first antenna element via a single first transmission element, the TRP system being coupled to the second antenna element via a single second transmission element,
wherein the TRP system is configured to:
transmit to the first oscillator element, via the first transmission element, a first activation signal,
receive from the first oscillator element, via the first and second transmission elements, a first calibration signal at a first frequency generated in response to the first activation signal, and
determine, based on the first calibration signal, a relative phase difference between the first and second transmission elements.

15. The system of claim 14, further comprising a splitter element at an output of the first oscillator element and configured to provide the first calibration signal to the first and second transmission elements for transmission to the TRP system.

16. The system of claim 14, further comprising a probe element at an output of the first oscillator element and configured to wirelessly provide the first calibration signal to the first and second transmission elements for transmission to the TRP system.

17. The system of claim 14, wherein the TRP system is further configured to:
transmit to the first oscillator element, via the first transmission element, a second activation signal,
receive from the first oscillator element, via the first and second transmission elements, a second calibration signal, at a second frequency different from the first frequency, generated in response to the second activation signal, and
determine, based on the first and second calibration signals, a relative phase difference between the first and second transmission elements.

18. The system of claim 14, further comprising:
a second oscillator element coupled to the second antenna element,
wherein the TRP system is further configured to:
transmit to the second oscillator element, via the second transmission element, a second activation signal, receive from the second oscillator element, via the first and second transmission elements, a second calibration signal, at a second frequency different from the first frequency, generated in response to the second activation signal, and determine, based on the first and second calibration signals, a relative phase difference between the first and second transmission elements.

19. The system of claim 18, wherein the TRP system includes a first transmitter coupled to the first transmission element and configured to generate the first activation signal, and a second transmitter coupled to the second transmission element and configured to generate the second activation signal.

* * * * *